L. J. RICKARD.
AUTO SIGNAL.
APPLICATION FILED AUG. 9, 1919.

1,324,434.

Patented Dec. 9, 1919.

WITNESSES

R. E. Rousseau
E. Tower

INVENTOR
L. J. Rickard
BY
ATTORNEYS

UNITED STATES PATENT OFFICE.

LESTER JOHN RICKARD, OF SEATTLE, WASHINGTON.

AUTO-SIGNAL.

1,324,434.  Specification of Letters Patent.  Patented Dec. 9, 1919.

Application filed August 9, 1919. Serial No. 316,294.

*To all whom it may concern:*

Be it known that I, LESTER J. RICKARD, a citizen of the United States, and a resident of Seattle, in the county of King and State of Washington, have made certain new and useful Improvements in Auto-Signals, of which the following is a specification.

My invention relates to signals, and particularly to auto signals for indicating the direction in which a vehicle is about to turn.

An object of my invention is the provision of a signal comprising a movable indicating arm formed of a plurality of foldable sections, whereby the arm when in non-indicating position can be compactly folded so as to occupy a relatively small space and thus not interfere with the operation of the automobile.

Another object of my invention is the provision of means for moving the indicating arm to indicating position.

I will describe one form of signal embodying my invention, and will then point out the novel features thereof in the claim.

In the accompanying drawings.

Similar reference characters refer to similar parts in each of the several views.

Figure 1:
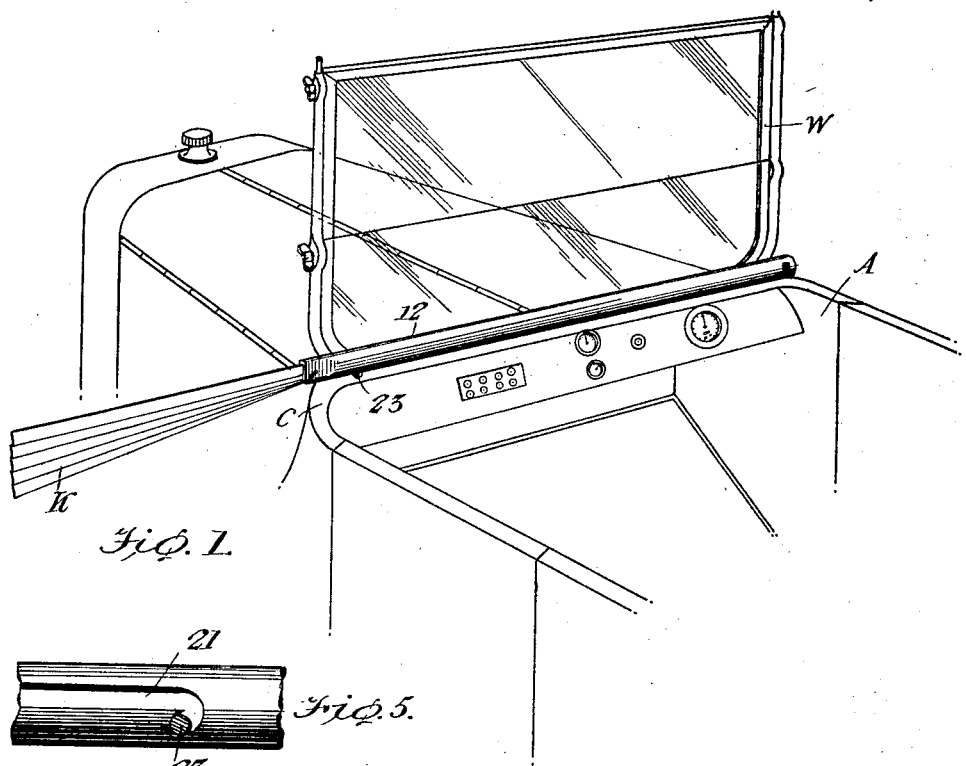
Figure 1 is a perspective view of an automobile having applied thereto one form of signal embodying my invention.
Figure 5:
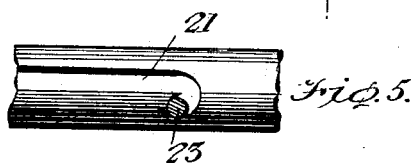
Figs. 4 and 5 are views showing details of the signal.
Figure 2:
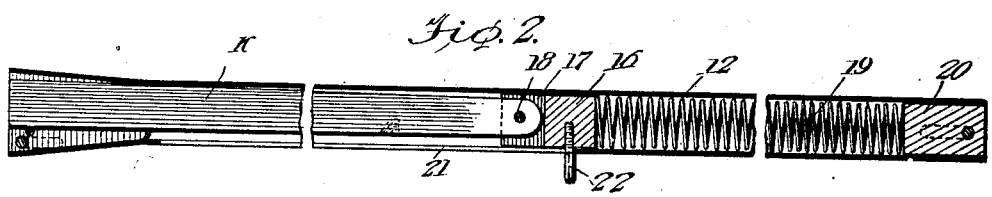
Fig. 2 is a view showing in longitudinal section the signal shown in Fig. 1.
Figure 4:
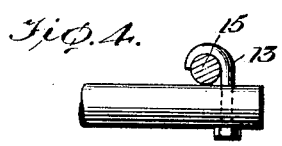

Referring specifically to the drawings, and particularly to Fig. 1, A designates a conventional form of automobile including a cowl C upon which is mounted a wind shield W. The signal embodying my invention comprises a tubular casing 12, which is secured to the upper edge of the cowl C and rearwardly of the wind shield W by means of bolts 13 and 14. As shown in Fig. 4, the bolts 13 and 14 are of substantially J-formation, with the curved portions embracing rods 15 which constitute a part of the frame of the wind shield W. Slidably mounted within the casing 12 is a plunger 16 provided with an extension 17, upon which is pivotally connected as at 18 an indicating arm generally indicated at K. The plunger 16 is normally biased to the left as when viewed in Fig. 2 by means of a retractile spring 19, one end of which bears upon the plunger 16 while its opposite end engages a block 20, fitted within the casing 12, and held therein by means of a bolt 13. As shown in Figs. 2 and 5, the casing 12 is formed with a longitudinally extending slot 21, in which slides an operating pin 22 secured within the plunger 16. As shown in Fig. 5, the right hand end of the slot 21 is formed with a bill 23 in which the pin 22 is adapted to rest when holding the plunger 16 in retracted position.

Figure 3:
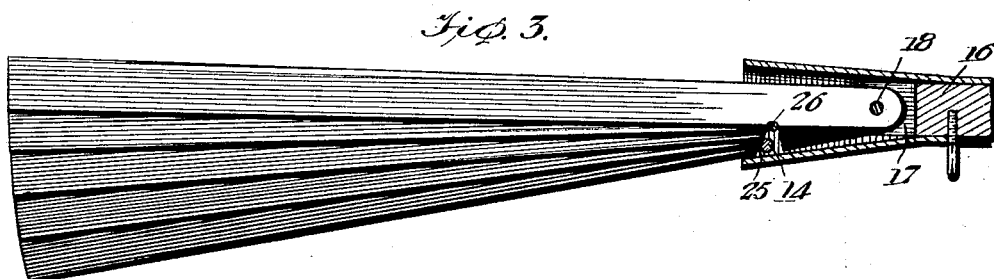
Fig. 3 is an enlarged fragmentary detailed view showing the indicating arm in indicating position.

As illustrated to advantage in Fig. 3, the indicating arm K comprises a plurality of leaves or bars 24, each of which is pivoted to the extension 17 at 18. The leaves 24 are of equal length and are provided at a common point on its under edge with recesses 25. The recesses 25 progressively increase in depth rearwardly from the foremost leaf, so that the rearmost leaf contains the deepest recess. The purpose of these recesses is to allow the several leaves 24 to assume a fan formation as shown in Figs. 1 and 3, thus providing an indicating arm of sufficient width to provide a signal which may be readily observed. To this end the open end of the casing 12 is flattened and spread so as to permit the leaves 24 to assume a fan formation. For actually spreading the leaves 24 I provide a pin 26, which extends transversely through the spread portion of the casing and works within the recesses 25, as clearly shown in Fig. 3.

The operation of the signal is as follows: When the indicating arm is in non-indicating position, it is housed within the casing 12 and is locked therein by means of the operating pin 22, which reposes within the bill 23 of the slot 21. With the pin in this position, the block 16 is of course held against movement by the action of the spring 19. When desiring to move the indicating arm K to indicating position, the operating pin 22 is removed from the bill 23 by shifting the same circumferentially of the casing 12. This allows the plunger 16 to respond to the biasing action of the spring 19, thus causing the indicating arm to be projected from the casing as shown in Figs. 1 and 3. As the indicating arm moves to indicating position, the pin 26 moves into the recesses 25 thus allowing the blades to assume fan formation.

Although I have herein shown and described only one form of auto signal embodying my invention, it is to be understood that various changes and modifications may be made herein without departing from the spirit of the invention and the spirit and scope of the appended claim.

Having described my invention, what I claim is:—

An auto signal, comprising a tubular casing having one end thereof closed and the opposite end open and flattened, a plunger slidable within the casing, a retractile spring within the casing and acting to bias the plunger toward the open end of the casing, a bayonet slot formed in the casing, an operating pin carried by the plunger and working in said slot, a pin extending transversely of the flattened end of said casing, and an indicating arm comprising a plurality of leaves pivotally connected to said plunger and having recesses formed therein of progressively increasing depths, for the purpose described.

LESTER JOHN RICKARD.